US011867101B1

(12) United States Patent
Simoneau et al.

(10) Patent No.: US 11,867,101 B1
(45) Date of Patent: Jan. 9, 2024

(54) ASSEMBLIES AND METHODS FOR CONTROLLING LUBRICATION FOR ROTARY ENGINE APEX SEALS

(71) Applicant: Pratt & Whitney Canada Corp., Longueuil (CA)

(72) Inventors: Jean-Philippe Simoneau, Saint-Constant (CA); Vincent Savaria, Laval (CA); David Gagnon-Martin, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/951,843

(22) Filed: Sep. 23, 2022

(51) Int. Cl.

| | |
|---|---|
| ***F01M 11/06*** | (2006.01) |
| ***F02B 53/02*** | (2006.01) |
| ***F02B 55/02*** | (2006.01) |
| *F02B 53/00* | (2006.01) |

(52) U.S. Cl.
CPC ........... *F01M 11/061* (2013.01); *F02B 53/02* (2013.01); *F02B 55/02* (2013.01); *F02B 2053/005* (2013.01)

(58) Field of Classification Search
CPC ....... F01M 11/061; F02B 53/02; F02B 55/02; F02B 2053/005
See application file for complete search history.

(56) References Cited

U.S. PATENT DOCUMENTS

| | | | |
|---|---|---|---|
| 4,660,517 | A | 4/1987 | Fujimoto |
| 10,823,097 | B2 | 11/2020 | Lanktree |

FOREIGN PATENT DOCUMENTS

| | | | | |
|---|---|---|---|---|
| JP | S6229603 | B2 | * | 6/1987 |
| JP | 62248803 | A | | 10/1987 |
| JP | H04241752 | A | * | 8/1992 |
| JP | H04246202 | A | * | 9/1992 |
| JP | 2009138653 | A | * | 6/2009 |

* cited by examiner

*Primary Examiner* — Audrey B. Walter
(74) *Attorney, Agent, or Firm* — Getz Balich LLC

(57) ABSTRACT

An assembly includes a rotor housing, a first rotor, a lubrication system, a first vibration sensor, and an engine control system. The rotor housing forms a first rotor cavity. The first rotor is configured for rotation within the first rotor cavity. The first rotor includes the plurality of apex seals. The lubrication system is configured to supply a lubrication flow for lubrication of the plurality of apex seals. The first vibration sensor is on the rotor housing. The first vibration sensor is configured to generate a vibration measurement signal. The engine control system includes a processor in communication with a non-transitory memory storing instructions, which instructions when executed by the processor, cause the processor to: identify that the vibration measurement signal exceeds a first vibration threshold, and increase a flow rate of the lubrication flow based on an identification of the vibration measurement signal exceeding the first vibration threshold.

16 Claims, 6 Drawing Sheets

ASSEMBLIES AND METHODS FOR CONTROLLING LUBRICATION FOR ROTARY ENGINE APEX SEALS

TECHNICAL FIELD

This disclosure relates generally to rotary engines for aircraft and, more particularly, to assemblies and methods for controlling lubrication of apex seals for a rotary engine.

BACKGROUND OF THE ART

A rotary engine for an aircraft may be configured, for example, as a Wankel engine. The rotary engine may include a rotor having a number of apex seals configured to contact a rotor housing as the rotor rotates within the rotor housing. The apex seals may be lubricated during operation of the rotary engine to minimize wear of the apex seals as well as the rotor housing. Various systems and methods are known in the art for lubrication apex seals of a rotary engine. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for controlling lubrication of a plurality of apex seals for a rotary engine includes a rotor housing, a first rotor, a lubrication system, a first vibration sensor, and an engine control system. The rotor housing forms a first rotor cavity. The first rotor is disposed within the first rotor cavity. The first rotor is configured for rotation within the first rotor cavity. The first rotor includes the plurality of apex seals. Each apex seal of the plurality of apex seals is configured to form a seal between the first rotor and the rotor housing as the first rotor rotates within the first rotor cavity. The lubrication system is in fluid communication with the first rotor cavity. The lubrication system is configured to supply a lubrication flow to the first rotor cavity for lubrication of the plurality of apex seals. The first vibration sensor is on the rotor housing. The first vibration sensor is configured to generate a vibration measurement signal. The engine control system is in communication with the lubrication system and the first vibration sensor. The engine control system includes a processor in communication with a non-transitory memory storing instructions, which instructions when executed by the processor, cause the processor to: identify that the vibration measurement signal exceeds a first vibration threshold, and control the lubrication system to increase a flow rate of the lubrication flow based on an identification of the vibration measurement signal exceeding the first vibration threshold.

In any of the aspects or embodiments described above and herein, the instructions, when executed by the processor, may further cause the processor to: identify that the vibration measurement signal decreases below a second vibration threshold, and control the lubrication system to decrease the flow rate of the lubrication flow based on an identification of the vibration measurement signal decreasing below the second vibration threshold.

In any of the aspects or embodiments described above and herein, the instructions, when executed by the processor, may further cause the processor to identify that the vibration measurement signal decreases below a second vibration threshold after identification of the vibration measurement signal exceeding the first vibration threshold.

In any of the aspects or embodiments described above and herein, the instructions, when executed by the processor, may further cause the processor to filter the vibration measurement signal based on a crank angle of the first rotor.

In any of the aspects or embodiments described above and herein, the instructions, when executed by the processor, may further cause the processor to filter the vibration measurement signal for portions the crank angle which are outside of one or more selected angle portions of a crank angle range.

In any of the aspects or embodiments described above and herein, the one or more selected angle portions combined may include less than 180 degrees of the crank angle range.

In any of the aspects or embodiments described above and herein, the assembly may further include a plurality of rotors. The plurality of rotors may include the first rotor. The rotor housing may form a plurality of rotor cavities. The plurality of rotor cavities may include the first rotor cavity. Each rotor of the plurality of rotors may be disposed within a respective rotor cavity of the plurality of rotor cavities.

In any of the aspects or embodiments described above and herein, the first vibration sensor may be a single vibration sensor for the assembly.

In any of the aspects or embodiments described above and herein, the plurality of rotors may be axially distributed along a rotational axis of the assembly. The first vibration sensor may be mounted to the rotor housing at an axial center of the rotor housing.

In any of the aspects or embodiments described above and herein, the lubrication system may be in fluid communication with each rotor cavity of the plurality of rotor cavities. The instructions, when executed by the processor, may further cause the processor to control the lubrication system to increase the flow rate of the lubrication flow to each rotor cavity of the plurality of rotor cavities based on the identification of the vibration measurement signal exceeding the first vibration threshold.

In any of the aspects or embodiments described above and herein, the lubrication system may be in fluid communication with each rotor cavity of the plurality of rotor cavities. The instructions, when executed by the processor, may further cause the processor to control the lubrication system to increase the flow rate of the lubrication flow to the first rotor cavity, relative to the other rotor cavities of the plurality of rotor cavities, based on the identification of the vibration measurement signal exceeding the first vibration threshold.

In any of the aspects or embodiments described above and herein, the assembly may further include a plurality of vibration sensors on the rotor housing. The plurality of vibration sensors may include the first vibration sensor.

According to another aspect of the present disclosure, a method for controlling lubrication of a plurality of apex seals for a rotary engine includes generating a vibration measurement signal with a vibration sensor for a rotor including the plurality of apex seals, monitoring the vibration measurement signal and identifying that the vibration measurement signal exceeds a first vibration threshold, and controlling lubrication of the plurality of apex seals by increasing a flow rate of a lubrication flow for the plurality of apex seals based on an identification of the vibration measurement signal exceeding the first vibration threshold.

In any of the aspects or embodiments described above and herein, the method may further include determining the first vibration threshold based on an engine power of the rotary engine.

In any of the aspects or embodiments described above and herein, monitoring the vibration measurement signal may further include filtering the vibration measurement signal based on a crank angle of the rotor.

In any of the aspects or embodiments described above and herein, filtering the vibration measurement signal may further include filtering the vibration measurement signal for portions the crank angle which are outside of one or more selected angle portions of a crank angle range.

In any of the aspects or embodiments described above and herein, filtering the vibration measurement signal may further include determining the one or more selected angle portions based on an operational state of the rotory engine.

According to another aspect of the present disclosure, an assembly for controlling lubrication of a plurality of apex seals for a rotary engine includes a rotor housing, a first rotor, a first vibration sensor, and an engine control system. The rotor housing forms a first rotor cavity. The first rotor is disposed within the first rotor cavity. The first rotor is configured for rotation within the first rotor cavity. The first rotor includes the plurality of apex seals. Each apex seal of the plurality of apex seals is configured to form a seal between the first rotor and the rotor housing as the first rotor rotates within the first rotor cavity. The first vibration sensor is on the rotor housing. The first vibration sensor is configured to generate a vibration measurement signal. The engine control system is in communication with the first vibration sensor. The engine control system includes a processor in communication with a non-transitory memory storing instructions, which instructions when executed by the processor, cause the processor to: filter the vibration measurement signal based on a crank angle of the first rotor, and compare that the filtered vibration measurement signal to a first vibration threshold to identify that a low lubricant flow condition is present or absent for at least one apex seal of the plurality of apex seals.

In any of the aspects or embodiments described above and herein, the instructions, when executed by the processor, may further cause the processor to filter the vibration measurement signal for portions the crank angle which are outside of one or more selected angle portions of a crank angle range.

In any of the aspects or embodiments described above and herein, the instructions, when executed by the processor, further cause the processor to generate a notification based on an identification of the filtered vibration measurement signal exceeding the first vibration threshold.

The present disclosure, and all its aspects, embodiments and advantages associated therewith will become more readily apparent in view of the detailed description provided below, including the accompanying drawings.

DETAILED DESCRIPTION

Figure 1:
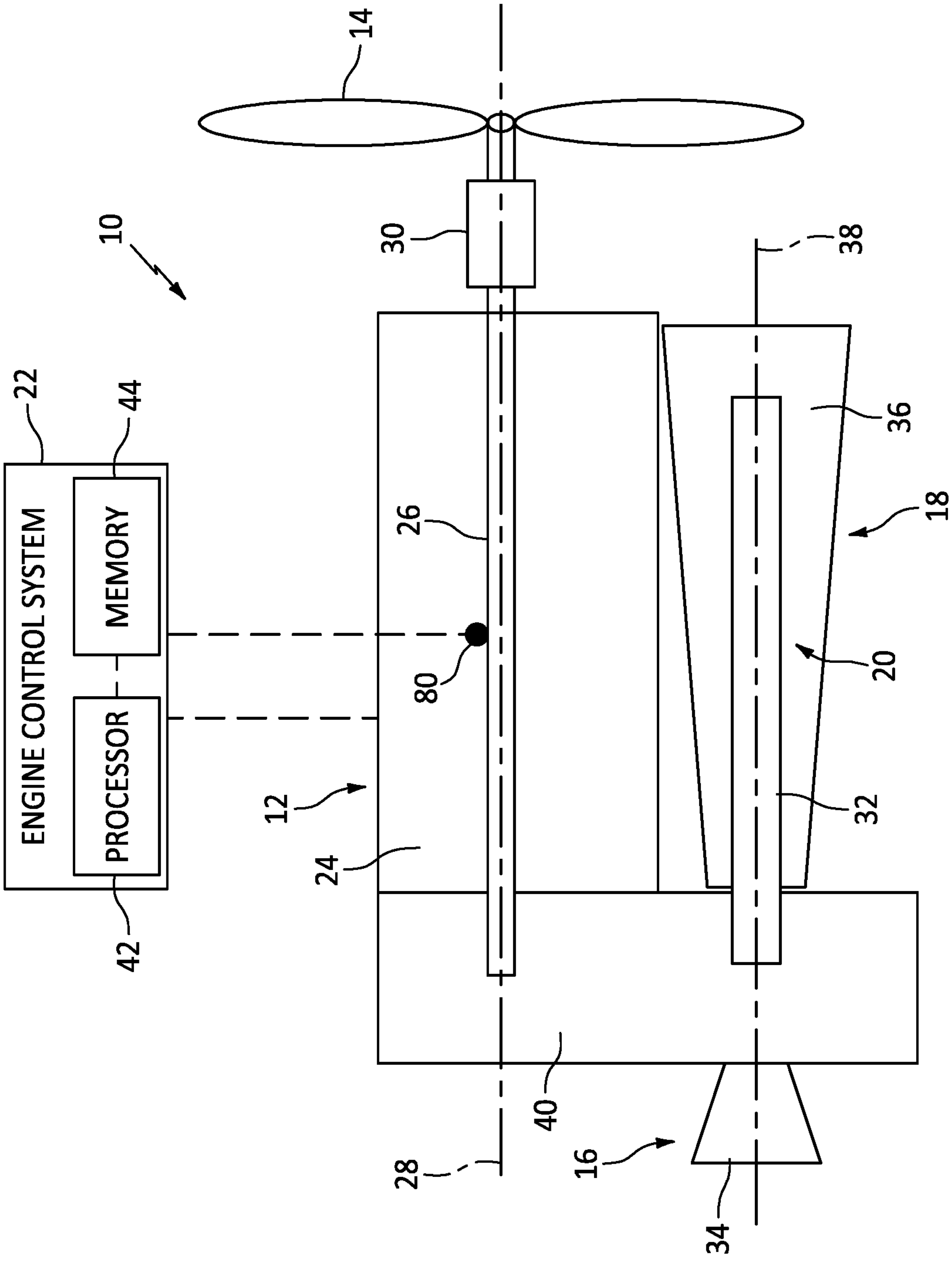
FIG. 1 illustrates a schematic view of an engine assembly, in accordance with one or more embodiments of the present disclosure.

FIG. 1 illustrates an engine assembly 10. The engine assembly 10 may form a portion of a propulsion system for an aircraft, however, the present disclosure is not limited to any particular application of the engine assembly 10. The engine assembly 10 of FIG. 1 includes an engine 12, a rotational load 14, a compressor section 16, a turbine section 18, a rotational assembly 20, and an engine control system 22.

The engine 12 of FIG. 1 is configured as a rotary intermittent internal combustion engine, which intermittent internal combustion engine includes one or more rotor assemblies 24 and an engine shaft 26. For example, the engine 12 may include three rotor assemblies 24. Each rotor assembly 24 may be configured, for example, as a Wankel engine in which an eccentric rotor configuration is used to convert fluid pressure into rotational motion.

The rotor assemblies 24 are coupled to the engine shaft 26 and configured to drive the engine shaft 26 for rotation about a rotational axis 28. The engine shaft 26 is coupled to the rotational load 14 such that rotation of the engine shaft 26 by the rotor assemblies 28 drives rotation of the rotational load 14. The engine shaft 26 may be coupled to the rotational load 14 by a speed-reducing gear assembly 30 of the engine 12. The speed-reducing gear assembly 30 may be configured to effect rotation of the rotational load 14 at a reduced rotational speed relative to the engine shaft 26. The rotational load 14 of FIG. 1 is configured as a propeller. Rotation of the propeller by the engine 12 may generate thrust for an aircraft which includes the engine assembly 10. The engine assembly 10 of the present disclosure may additionally or alternatively be configured to drive other rotational loads, such as, but not limited to, an electrical generator(s), a rotational accessory load, a rotor mast, a compressor, or any other suitable rotational load configuration.

The rotational assembly 20 of FIG. 1 includes a shaft 32, a bladed compressor rotor 34 of the compressor section 16, and a bladed turbine rotor 36 of the turbine section 18. The shaft 32 interconnects the bladed compressor rotor 34 and the bladed turbine rotor 36. The shaft 32, the bladed compressor rotor 34, and the bladed turbine rotor 36 are mounted to rotation about a rotational axis 38. Ambient air is received by the compressor section 16. The air is compressed by rotation of the bladed compressor rotor 34 and directed to an air intake of the engine 12. Combustion exhaust gases from the engine 12 are directed to the turbine section 18 causing the bladed turbine rotor 36 to rotate and rotationally drive the rotational assembly 20. The engine shaft 26 and the rotational assembly 20 may be rotatably coupled by a gearbox 40 of the engine assembly 10, thereby allowing the engine 12 and/or the bladed turbine rotor 36 to rotationally drive the bladed compressor rotor 34. The present disclosure, however, is not limited to the particular engine 12 and rotational assembly 20 configuration of FIG. 1.

The engine control system 22 of FIG. 1 includes a processor 42 and memory 44. The memory 44 is in signal communication with the processor 42. The processor 42 may include any type of computing device, computational circuit, or any type of process or processing circuit capable of executing a series of instructions that are stored in the memory 44, thereby causing the processor 42 to perform or control one or more steps or other processes. The processor 42 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 44 may represent one or more algorithms for controlling the aspects of the engine assembly 10, and the stored instructions are not limited to any particular form (e.g., program files, system data, buffers, drivers, utilities, system programs, etc.) provided they can be executed by the processor 42. The memory 44 may be a non-transitory computer readable storage medium configured to store instructions that when executed by one or more processors, cause the one or more processors to perform or cause the performance of certain functions. The memory 44 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 22 may be achieved via the use of hardware, software, firmware, or any combination thereof. The engine control system 22 may also include input and output devices (e.g., keyboards, buttons, switches, touch screens, video monitors, sensor readouts, data ports, etc.) that enable the operator to input instructions, receive data, etc. The engine control system 22 may be in communication (e.g., signal communication) with one or more sensors 80 of the engine assembly 10, which one or more sensors may be configured to facilitate monitoring of operational parameters of the engine assembly 10 by the engine control system 22. The one or more sensors 80 may include sensors such as, but not limited to, temperature sensors, pressure sensors, fuel flow sensors, shaft rotation speed and/or position sensors, shaft torque sensors, and the like.

The engine control system 22 may form or otherwise be part of an electronic engine controller (EEC) for the engine assembly 10. The EEC may control operating parameters of the engine assembly 10 including, but not limited to fuel flow so as to control an engine power and/or thrust of the engine assembly 10. In some embodiments, the EEC may be part of a full authority digital engine control (FADEC) system for the engine assembly 10.

Figure 2:
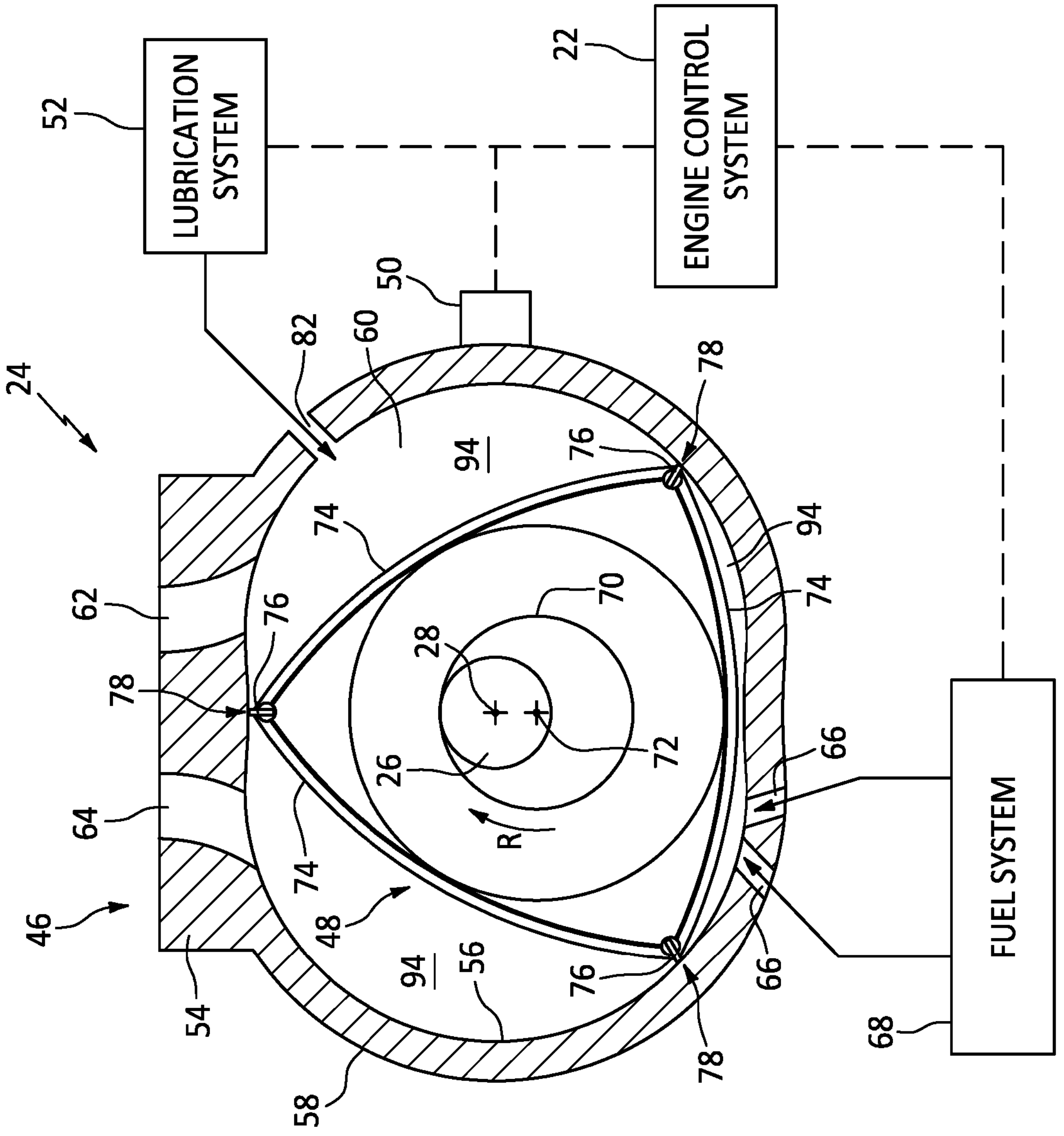
FIG. 2 illustrates a cutaway view of a rotor assembly for the engine assembly of FIG. 1 with additional portions of the engine assembly schematically illustrated, in accordance with one or more embodiments of the present disclosure.

FIG. 2 illustrates a cutaway view of the rotor assembly 24. The rotor assembly 24 of FIG. 2 includes a rotor housing 46, a rotor 48, a vibration sensor 50, and a lubrication system 52.

The rotor housing 46 includes a housing body 54. The housing body 54 includes an interior surface 56 and an exterior surface 58. The interior surface 56 forms and surrounds a rotor cavity 60 of the rotor assembly 24. The rotor cavity 60 may be formed with two lobes, which two lobes may collectively be configured with an epitrochoid shape. The housing body 54 forms an intake port 62, an exhaust port 64, one or more fuel system passages 66, and one or more lubrication system passages 82. The intake port 62 is in fluid communication with the rotor cavity 60. The intake port 62 is configured to direct compressed air to the rotor cavity 60, for example, from the compressor section 16 (see FIG. 1). The exhaust port 64 is in fluid communication with the rotor cavity 60. The exhaust port 64 is configured to direct combustion exhaust gas out of the rotor cavity 60. For example, the exhaust port 64 may be configured to direct the combustion exhaust gas from the rotor cavity 60 to the turbine section 18 (see FIG. 1). The fuel system passages 66 provide access to the rotor cavity 60 for a spark plug or other ignition device and/or for one or more fuel injectors of a fuel system 68. The lubrication system passages 82 are in fluid communication with the rotor cavity 60. The lubrication system passages 82 are configured to direct a lubricant from the lubrication system 52 into the rotor cavity 60 for lubrication of portions of the rotor 48. It should be understood, however, that the present disclosure is not limited to the lubrication system passages 82 of FIG. 2 and that different numbers of, configurations of, and/or locations of the lubrication system passages 82 may alternatively be used.

The housing body 54 of the present disclosure may be understood to be formed by a plurality of discrete housing body 54 portions such as, but not limited to, one or more rotor body portions each forming a respective rotor cavity 60, one or more intermediate body portions separating adjacent rotor body portions, and/or one or more end body portions forming ends (e.g., axial ends) of the housing body 54. However, the present disclosure is not limited to any particular number or configuration of rotor housing 46 components for forming the housing body 54.

The rotor 48 of FIG. 2 is coupled to an eccentric portion 70 of the engine shaft 26. The rotor 48 is disposed within the rotor cavity 60. The rotor 48 is configured to rotate (e.g., in rotation direction R) with the eccentric portion 70 about a rotational axis 72 of the rotor 48 to perform orbital revolutions within the rotor cavity 60. The rotational axis 72 may be offset from and parallel to the rotational axis 28.

The rotor 48 of FIG. 2 includes three sides 74 and three apex seals 76. The sides 74 of the rotor 48 form a generally triangular cross-sectional shape of the rotor 48 (e.g., along a plane extending perpendicular to the rotational axis 72). The sides 74 may be configured with a convex curvature, which convex curvature faces away from the rotational axis 72. Each side 74 intersects each other side 74 at an apex portion 78 of the rotor 48.

Each apex seal 76 is disposed at a respective apex portion 78. Each apex seal 76 extends outward (e.g., radially outward) from each respective apex portion 78 toward the rotor housing 46. The apex seals 76 may be configured as spring-loaded seals, which spring-loaded seals are biased in an outer radial position. Each apex seal 76 is configured to sealingly contact the interior surface 56, thereby forming three separate working chambers 94 of variable volume between the rotor 48 and the rotor housing 46.

In operation of the engine 12, the fuel system is configured to effect rotation of the rotor 48 by directing a fuel into the rotor cavity 60 and igniting the fuel in a defined sequence. During each orbital revolution of the rotor 48, each working chamber 94 varies in volume and moves about the rotor cavity 48 to undergo four phases of intake, compression, expansion, and exhaust.

The vibration sensor 50 is positioned on the rotor housing 46. For example, the vibration sensor 50 may be mounted on the exterior surface 58. The vibration sensor 50 is configured to measure a vibration of the rotor assembly 24 and generate a vibration measurement signal (e.g., a signal proportional to the measured vibration). The vibration sensor 50 may be configured, for example, as an accelerometer, a strain sensor, or any other suitable sensor for measuring vibration of the rotor assembly 24. The vibration sensor 50 is in communication (e.g., signal communication) with the engine control system 22 (see FIG. 1). The rotor assembly 24 may include more than one vibration sensor 50. For example, the rotor assembly 24 may include a plurality of vibration sensors 50 mounted on different axial and/or circumferential portions of the rotor housing 46, relative to the rotational axis 28 for example, to monitor rotor assembly 24 vibration at different positions relative to the rotor 48. The vibration sensor 50 of FIG. 2 is illustrated as being positioned on the exterior surface 58 of an axially-extending side of the rotor housing 46, however, the present disclosure is not limited to any particular location on the rotor housing 46 for the vibration sensor 50. For example, the vibration sensor 50 may alternatively be positioned on one or both axial ends of the rotor housing 46.

The lubricant system 52 of FIG. 2 is configured to direct a lubricant into the rotor cavity 60 for lubrication of the apex seals 76. The lubricant system 52 is in fluid communication with the rotor cavity 60 through the lubrication system passages 82. The lubrication system 52 of FIG. 2 is configured to direct lubricant to the apex seals 76 at a position between the intake port 62 and the fuel system passages 66 along rotational path of the apex seals 76. The present disclosure, however, is not limited to this lubrication system 52 configuration of FIG. 2.

Figure 3:
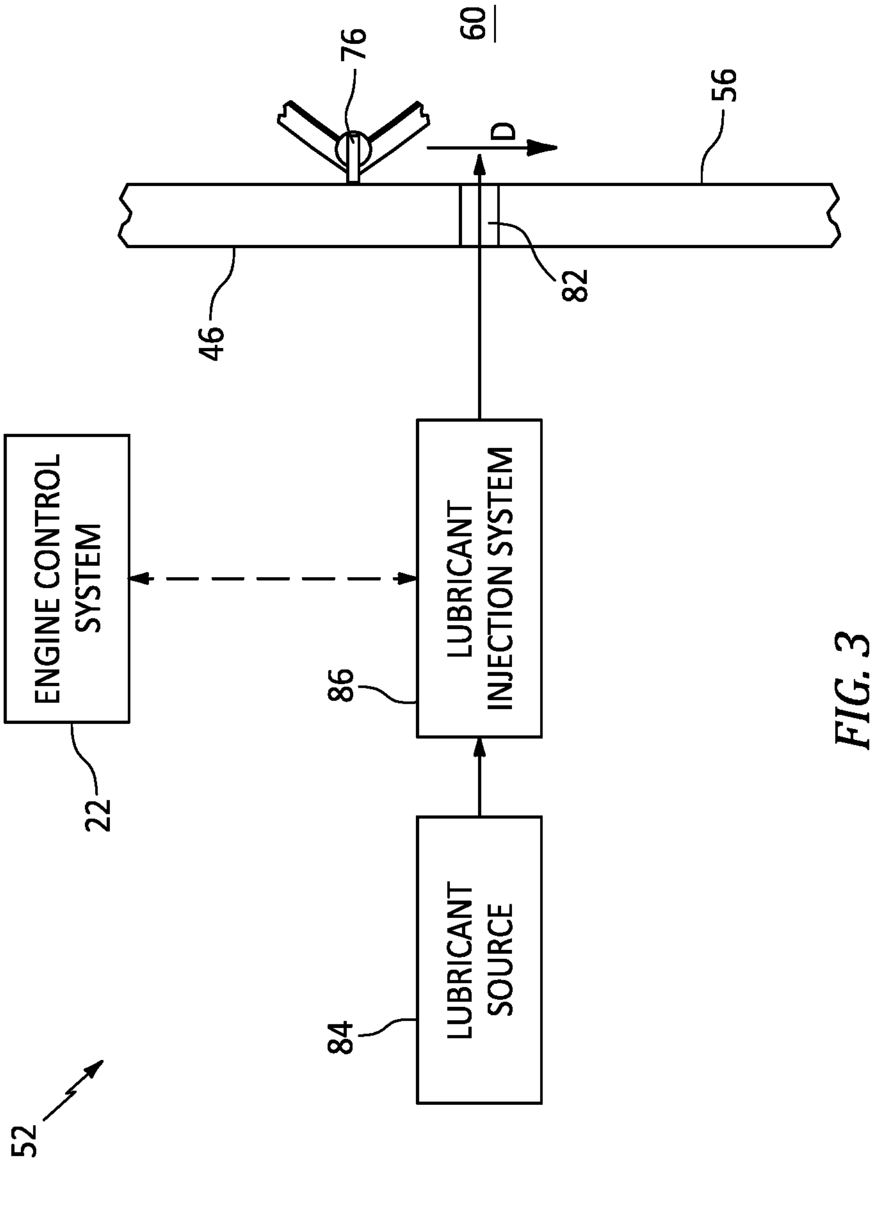
FIG. 3 illustrates a schematic view of a lubrication system for a rotor assembly, in accordance with one or more embodiments of the present disclosure.

FIG. 3 schematically illustrates an exemplary embodiment of the lubrication system 52. The lubrication system 52 of FIG. 3 includes a lubricant source 84 and a lubricant injection system 86. The lubricant source 84 may be configured as a fluid tank for storing a lubricant such as, but not limited to oil. The lubricant injection system 86 is fluidly coupled to the lubricant source 84, for example, by a suitable conduit. The lubricant injection system 86 is configured to draw lubricant from the lubricant source 84 and inject the lubricant into the rotor cavity 60 through one or more suitable conduits and the lubricant system passages 82. The lubricant injection system 86 may include one or more lubricant pumps, flow control valves, variable flow nozzles, and the like, so as to allow the lubricant injection system 86 to inject the lubricant into the rotor cavity 60. The present disclosure is not limited to any particular configuration of the lubricant injection system 86. The lubricant directed into the rotor cavity 60 interacts with the apex seals 76 at an interface between the apex seals 76 and the interior surface 56, thereby hydrodynamically lubrication the apex seals 76 as the apex seals 76 move along the interior surface 56 (e.g., along direction D). The lubricant injection system 86 and/or one or more of its components are in communication (e.g., signal communication) with the engine control system 22. The engine control system 22 may control the lubricant injection system 86 to control the flow rate of the lubricant flow directed into the rotor cavity 60 by the lubrication system 52. It should be understood that the present disclosure is not limited to the particular lubrication system 52 configuration illustrated in FIG. 3 and described above.

Figure 4:
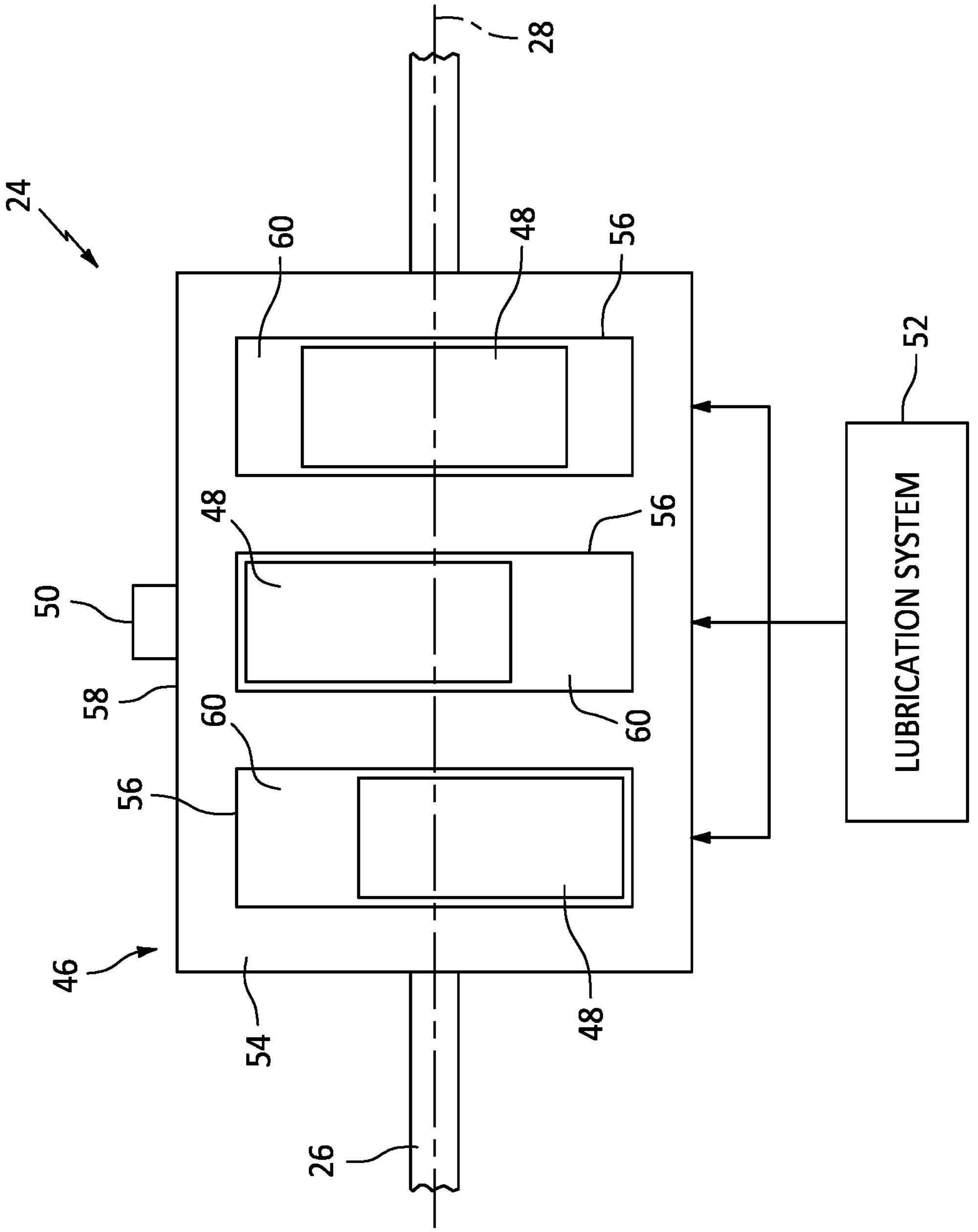
FIG. 4 illustrates a cutaway view of another rotor assembly, in accordance with one or more embodiments of the present disclosure.

FIG. 4 illustrates a cutaway view of the rotor assembly 24 including a plurality of rotors 48. The housing body 54 of the rotor housing 46 of FIG. 4 forms a rotor cavity 60 for each respective rotor 48 of the plurality of rotors 48. The rotor assembly 24 of FIG. 4 includes three rotors 48 and three rotor cavities 60, however, the present disclosure is not limited to any particular number of rotors 48 or rotor cavities 60 for the rotor assembly 24. The rotor cavities 60 of FIG. 4 are axially spaced along the engine shaft 26. The rotor cavities 60 are separated from each axially adjacent rotor cavity 60 by the rotor housing 46. Alternatively, the rotor cavity 60 for each rotor 48 of the plurality of rotors 48 may be formed by a distinct rotor housing 46, which rotor housings 46 may be axially distributed along the engine shaft 26. The rotor assembly 24 of FIG. 4 includes the vibration sensor 50 mounted on the rotor housing 46. The vibration sensor 50 may be mounted on the rotor housing 46 at (e.g., on, adjacent, or proximate) an intermediate axial position (e.g., an axial center) of the rotor housing 46 to monitor the collective vibration associated with operation of the plurality of rotors 48. Alternatively, the rotor assembly 24 may include a plurality of vibration sensors 50, for example, with each vibration sensor 50 positioned at (e.g., on, adjacent, or proximate) an axial location of each respective rotor 48. The lubrication system 52 of FIG. 4 is configured to direct lubricant into each rotor cavity 60 for lubrication of the apex seals 76 (see FIGS. 2 and 3) for each rotor 48. The lubrication system 52 may be configured to direct a substantially equal amount of lubricant into each rotor cavity 60. Alternatively, the lubrication system 52 may be configured to individually control a flow rate of the lubricant flow directed to each rotor cavity 60.

During operation of a rotary engine, such as the engine 12, the apex seals for the rotary engine may experience insufficient lubrication flow which may cause accelerated wear of the rotor housing and the apex seals. We have observed that insufficient apex seal lubrication flow and/or other abnormal tribological operating conditions of the apex seals may exhibit increased vibration of the rotor assembly, as measured at the rotor housing. Increased vibration of the rotor housing, relative to baseline vibration levels for a particular engine operating condition, may indicate that the apex seals of the rotor assembly are experiencing or are more likely to be experiencing insufficient lubrication flow and/or abnormal tribological operating conditions.

Figure 5:
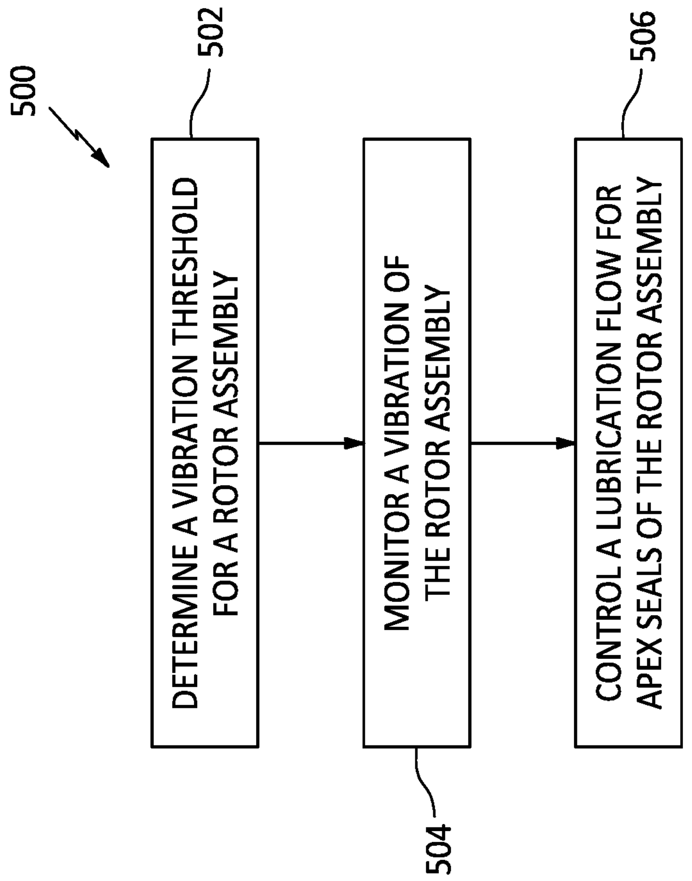
FIG. 5 illustrates a flowchart depicting a method for controlling rotary engine apex seal lubrication, in accordance with one or more embodiments of the present disclosure.

Referring to FIGS. 2 and 5, a Method 500 for controlling rotary engine apex seal lubrication is provided. FIG. 5 illustrates a flowchart for the Method 500. The Method 500 may be performed, for example, in combination with the engine 12 and engine control system 22. For example, the processor 42 may execute instructions stored in memory 44, thereby causing the engine control system 22 and/or its processor 42 to execute or otherwise control one or more steps of the Method 500. However, while the Method 500 may be described herein with respect to the engine 12 and/or the engine control system 22, the present disclosure Method 500 is not limited to use with the engine 12 and/or the engine control system 22. Unless otherwise noted herein, it should be understood that the steps of Method 500 are not required to be performed in the specific sequence in which they are discussed below and, in some embodiments, the steps of Method 500 may be performed separately or simultaneously.

In Step 502, one or more vibration thresholds may be determined or otherwise identified or obtained for the rotor assembly 24. A first vibration threshold may be determined, which first vibration threshold may be indicative of a high-vibration condition for the rotor assembly 24. The first vibration threshold may be selected to identify a low lubrication condition and/or an abnormal tribological condition for the apex seals 76. A second vibration threshold may additionally be determined, which second vibration threshold may be indicative of a high lubrication condition or an acceptable lubrication condition for the apex seals 76. A value of the second vibration threshold may be lower than a value of the first vibration threshold. Values of the first vibration threshold and/or the second vibration threshold may be predetermined values which may be, for example, experimentally and/or theoretically (e.g., by computer-implemented modeling) determined for the particular engine assembly 10 (e.g., a particular engine assembly 10 configuration, engine model, etc.). Alternatively, values of the first vibration threshold and/or the second vibration threshold may be dynamically determined, for example, by the engine control system 22 based on collected vibration data (e.g., measured by the vibration sensor 50). Values of the first vibration threshold and/or the second vibration threshold may be determined based on a condition or operational state of the engine 12 (see FIG. 1). For example, values of the first vibration threshold and/or the second vibration threshold may be determined based on an engine power of the engine 12, which engine power may be determined (e.g., by the engine control system 22) based on a fuel flow, an engine shaft 26 (see FIG. 1) rotation speed and/or torque, or other suitable operational parameters of the engine 12.

In Step 504, vibration of the rotor assembly 24 is monitored. For example, the engine control system 22 may monitor the vibration measurement signal generated by the vibration sensor 50. The engine control system 22 may monitor (e.g., continuously monitor) the vibration measurement signal generated by the vibration sensor 50 and compare the vibration measurement signal to the one or more vibration thresholds. The engine control system 22 may compare the vibration measurement signal to the first vibration threshold to identify that a low lubricant flow condition and/or an abnormal tribological condition is present or absent for the apex seals 76. The first vibration threshold may include a time component such that the engine control system 22 may identify that a low lubricant flow condition and/or an abnormal tribological condition exists for the rotor assembly 24 if the measured vibration is equal to or greater than a value of the first vibration threshold for an amount of time (e.g., a predetermined or dynamically determined time value). Upon identifying that a low lubricant flow condition and/or an abnormal tribological condition exists for the rotor assembly 24, the engine control system 22 may generate a notification (e.g., a warning light, an audible alarm, etc.) to alert a pilot and/or crew of an aircraft, associated with the engine assembly 10, of the abnormal condition.

The engine control system 22 may compare the vibration measurement signal to the second vibration threshold to identify that a normal or acceptable lubricant flow condition and/or tribological condition is present for the apex seals 76. For example, if the measured vibration exceeds the first vibration threshold, the engine control system 22 may compare the vibration measurement signal to the second vibration threshold to identify that the lubricant flow condition and/or tribological condition of the apex seals 76 has returned to normal or to an acceptable state. Like the first vibration threshold, the second vibration threshold may include a time component. Upon identifying that the lubricant flow condition and/or tribological condition of the apex seals 76 has returned to normal or to an acceptable state, the engine control system 22 may remove or otherwise dismiss a notification (e.g., a warning light, an audible alarm, etc.) which may have been generated to alert a pilot and/or crew of an aircraft associated with the engine assembly 10 of an abnormal condition. The pilot and/or crew may take one or more actions such as, but not limited to, increasing a lubrication flow to the apex seals 76 (e.g., by controlling the lubrication system 52) (see Step 506), reducing an engine power of the engine assembly 10, or one or more other actions for addressing a low lubricant flow condition and/or an abnormal tribological condition exists for the apex seals 76 of the rotor assembly 24.

Figure 6:
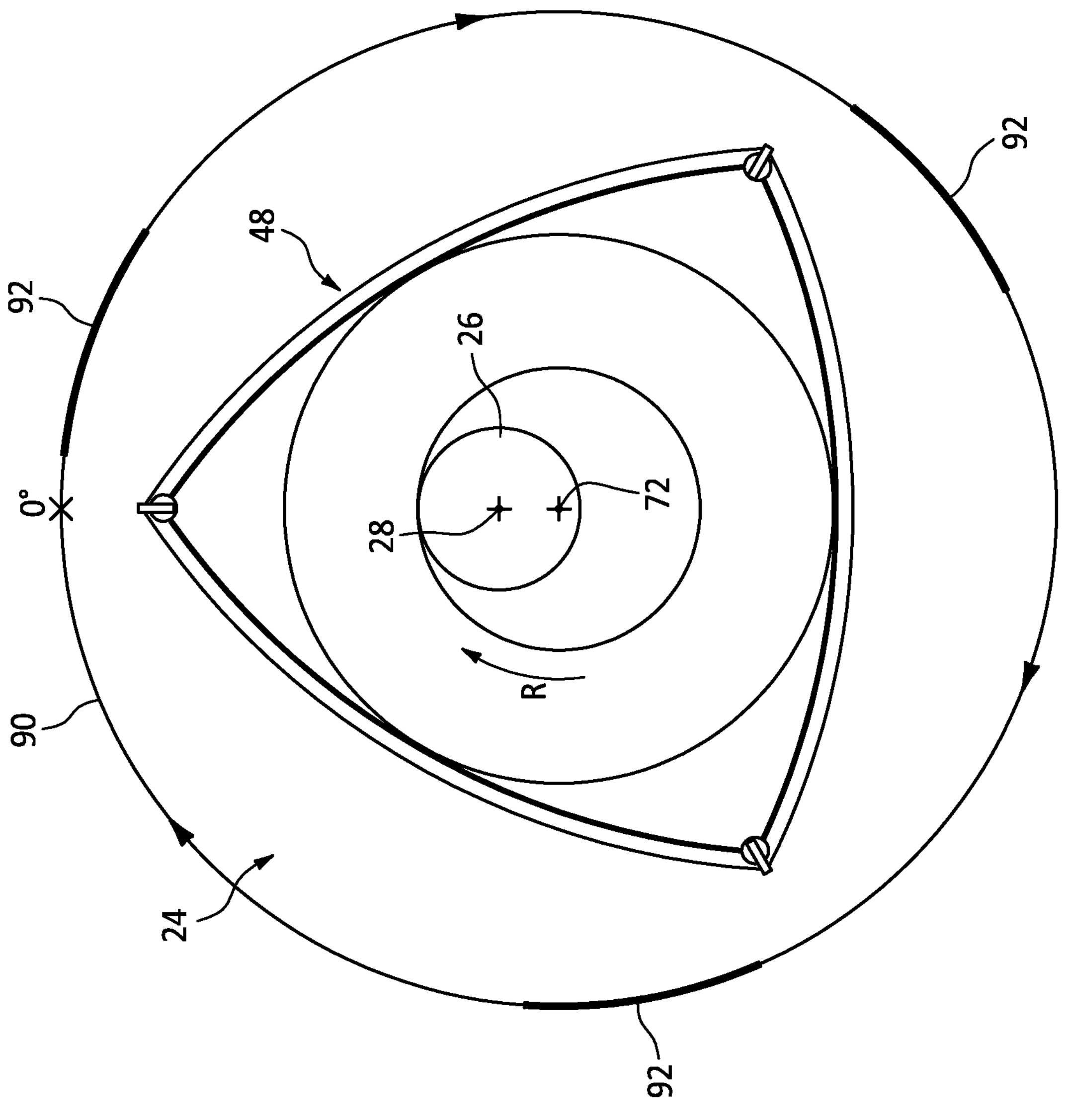
FIG. 6 illustrates a cutaway view of a portion of a rotor assembly, in accordance with one or more embodiments of the present disclosure.

Step 504 may include filtering the vibration measurement signal from the vibration sensor 50 based on a crank angle of the rotor 48. FIG. 6 illustrates the rotor 48 relative to a crank angle range 90. As used herein, the term “crank angle range” refers to an engine crank angle range (e.g., 360 degrees) for the rotor 48. A crank angle for the rotor 48 may be understand based on an orientation of the rotational axis 28 relative to the rotational axis 72. For example, the rotor 48 of FIG. 6 may be understood to have a crank angle of approximately 180 degrees. A crank angle of the rotor 48 may be determined, for example, by the engine control system 22 based on a shaft rotation speed and/or position sensor 80 for the engine shaft 26 (see FIG. 1). The engine control system 22 may monitor vibration of the rotor assembly 24 within (e.g., only within) selected angle portions 92 of the crank angle range 90. The selected angle portions 92 are identified in FIG. 6 by bold portions of the crank angle range 90. The selected angle portions 92 may include one or more portions of the crank angle range 90. For example, FIG. 6 illustrates three selected angle portions 92, however, the present disclosure is not limited to any particular number of selected crank angle portions 92. The combination of the selected angle portions 92 may be less than the crank angle range 90. The combination of the selected angle portions 92 may be less than 180 degrees of the crank angle range 90. The combination of the selected angle portions 92 may be less than 90 degrees of the crank angle range 90. The combination of the selected angle portions 92 may be less than 45 degrees of the crank angle range 90.

We have observed that measured vibration of a rotor assembly (e.g., the rotor assembly 24) may be greater for a rotor (e.g., the rotor 48) in some portions of a crank angle range for the rotor, relative to other portions of the crank angle range for the rotor. Accordingly, vibration of the rotor assembly 24 may be monitored for portions of the crank angle range (e.g., the selected angle portions 92) which may exhibit greater vibration relative to other portions of the crank angle range. The engine control system 22 may filter the vibration measurement signal measured by the vibration sensor 50 such that the filtered vibration measurement signal does not include portions of the vibration measurement signal with the rotor 48 outside of the selected angle portions 92 and/or such that the engine control system 22 does not evaluate portions of the vibration measurement signal with the rotor 48 outside of the selected angle portions 92. Filtering the vibration measurement signal occurring with the rotor 48 outside of the selected angle portions 92 may improve the accuracy of the engine control system 22 for identifying normal and abnormal lubrication flow and tribological conditions for the apex seals 76 and may reduce the likelihood of incorrectly identifying that a low lubricant flow condition and/or an abnormal tribological condition is present (e.g., a false positive indication) for the apex seals 76. For example, filtering the vibration measurement signal measured by the vibration sensor 50 may facilitate differentiation of vibration associated with low lubricant flow condition and/or an abnormal tribological conditions from vibration associated with other engine conditions or operations (e.g., abnormal combustion vibration).

We have also observed that measured vibration of a rotor assembly (e.g., the rotor assembly 24), which is attributable to a low lubricant flow condition and/or an abnormal tribological condition for apex seals, may exhibit a relatively high frequency signature (e.g., >10 kHz) compared to measured vibration which is attributable to other engine components and operational conditions. Vibration measurement signals for the rotor assembly 24 may additionally or alternatively be filtered based on a vibration frequency of the of the vibration measurement signals. For example, the engine control system 22 may filter the vibration measurement signal measured by the vibration sensor 50 such that the filtered vibration measurement signal does not include portions of the vibration measurement signal which are outside of one or more selected vibration frequency ranges. Filtering the vibration measurement signals occurring with the rotor 48 outside of the selected frequency range may improve the accuracy of the engine control system 22 for identifying normal and abnormal lubrication flow and tribological conditions for the apex seals 76 and may reduce the likelihood of incorrectly identifying that a low lubricant flow condition and/or an abnormal tribological condition is present (e.g., a false positive indication) for the apex seals 76.

Values of the selected angle portions 92 may be predetermined values which may be, for example, experimentally and/or theoretically (e.g., by computer-implemented modeling) determined for the particular engine assembly 10 (e.g., a particular engine assembly 10 configuration, engine model, etc.). Alternatively, values of the selected angle portions 92 may be dynamically determined, for example, by the engine control system 22 based on collected vibration data (e.g., measured by the vibration sensor 50) to determine portions of the crank angle range 90 which exhibit relatively higher (e.g., greater than average) vibration measurement signals. Values of the selected angle portions 92 may additionally be determined based on a condition or operational state of the engine 12 (see FIG. 1). For example, the selected angle portions 92 for the engine assembly 10 a first engine power may be different than the selected angle portions 92 for the engine assembly 10 at a second different engine power.

In Step 506, the lubrication flow supplied to the rotor cavity 60 is controlled based on the measured vibrations of the rotor assembly 24. The lubrication flow supplied to the rotor cavity 60 may have a baseline (e.g., default) flow rate controlled by the engine control system 22, which baseline flow rate may be based on an engine power of the engine 12 (e.g., based on a rotation speed of the engine shaft 26) (see FIG. 1). For example, a baseline flow rate of the lubrication flow supplied to the rotor cavity 60 by the lubrication system 52 may increase as an engine power of the engine 12 increases. Similarly, a baseline flow rate of the lubrication flow supplied to the rotor cavity 60 by the lubrication system 52 may decrease as an engine power of the engine 12 decreases. As described above with respect to Step 504, the engine control system 22 may compare (e.g., continuously compare) the vibration measurement signal from the vibration sensor 50 to the first vibration threshold to identify that a low lubricant flow condition and/or an abnormal tribological condition is present or absent for the apex seals 76. In the event that a low lubricant flow condition and/or an abnormal tribological condition is identified by the engine control system 22, the engine control system 22 may cause the lubrication system 52 to increase a flow rate of the lubrication flow to the rotor cavity 60 for increased lubrication of the apex seals 76 (see FIG. 3). For example, the engine control system 22 may cause the lubrication system 52 to increase a flow rate of the lubrication flow by a fixed amount (e.g., a fixed increase in lubricant flow rate). Alternatively, the engine control system 22 may cause the lubrication system 52 to continuously increase (e.g., ramp) a flow rate of the lubrication flow until the abnormal lubricant flow condition and/or tribological condition of the apex seals 76 is no longer present. Once the engine control system 22 identifies the low lubricant flow condition and/or an abnormal tribological condition for the apex seals 76, the engine control system 22 may maintain the increased lubrication flow rate to the rotor cavity 60, for example, until the vibration measurement signal decreases below the second vibration threshold indicating that the lubricant flow condition and/or tribological condition of the apex seals 76 has returned to normal or to an acceptable state.

For rotor assemblies having a plurality of rotors, such as the rotor assembly 24 of FIG. 4, the engine control system 22 and the vibration sensor 50 may identify that one or more of the plurality of rotors 48 are exhibiting a low lubricant flow condition and/or an abnormal tribological condition of their respective apex seals 76. Using the vibration measurement signal from the vibration sensor 50, the engine control system 22 may identify the particular one or more rotors 48 exhibiting the low lubricant flow condition and/or the abnormal tribological condition. As an example, filtering the vibration measurement signal measured by the vibration sensor 50 based on crank angle may facilitate identification of the affected rotors 48 because each of the rotors 48 may have a different crank angle position relative to each other rotor 48. As another example, the engine control system 22 may increase a lubrication flow for a first rotor 48 relative to the other rotors 48 of the plurality of rotors 48. If the vibration measurement signal measured by the vibration sensor 50 decreases, the engine control system 22 may identify that the first rotor 48 was exhibiting the low lubricant flow condition and/or the abnormal tribological condition. If the vibration measurement signal measured by the vibration sensor 50 remains elevated, the engine control system 22 may return the lubrication flow for a first rotor 48 to a lower value and increase a lubrication flow for a second rotor 48 relative to the other rotors 48 of the plurality of rotors 48. The engine control system 22 may continue this process until a rotor 48 exhibiting a low lubricant flow condition and/or an abnormal tribological condition of its respective apex seals 76 is identified.

The engine control system 22 may control the lubricant system 52 to increase the flow rate of the lubrication flow for those affected one or more rotors 48. For example, the engine control system 22 may control the lubrication system 52 to increase the flow rate of the lubrication flow to a first rotor cavity 60 relative to the other rotor cavities 60 of the plurality of rotor cavities 60. In some cases, identification of the particular one or more rotors 48 exhibiting the low lubricant flow condition and/or the abnormal tribological condition may not be immediately performed using the vibration measurement signal from the vibration sensor 50. For example, where the vibration sensor 50 is a single (e.g., only) vibration sensor for the rotor assembly 24, identification of the particular one or more rotors 48 exhibiting the low lubricant flow condition and/or the abnormal tribological condition may not be immediately performed. Accordingly, the engine control system 52 may control the lubricant system 52 to increase the flow rate of the lubrication flow for all of the rotors 48 of the rotor assembly 24.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. An assembly for controlling lubrication of a plurality of apex seals for a rotary engine, the assembly comprising:

a rotor housing forming a plurality of rotor cavities, the plurality of rotor cavities including a first rotor cavity;

a plurality of rotors including a first rotor, each rotor of the plurality of rotors disposed within a respective rotor cavity of the plurality of rotor cavities with the first rotor disposed within the first rotor cavity, the first rotor configured for rotation within the first rotor cavity, the first rotor including the plurality of apex seals, each apex seal of the plurality of apex seals configured to form a seal between the first rotor and the rotor housing as the first rotor rotates within the first rotor cavity;

a lubrication system in fluid communication with each rotor cavity of the plurality of rotor cavities, the lubrication system configured to supply a lubrication flow to the first rotor cavity for lubrication of the plurality of apex seals;

a first vibration sensor on the rotor housing, the first vibration sensor configured to generate a vibration measurement signal; and an engine control system in communication with the lubrication system and the first vibration sensor, the engine control system including a processor in communication with a non-transitory memory storing instructions, which instructions when executed by the processor, cause the processor to:

identify that the vibration measurement signal exceeds a first vibration threshold; and control the lubrication system to increase a flow rate of the lubrication flow to the first rotor cavity, relative to the other rotor cavities of the plurality of rotor cavities, based on an identification of the vibration measurement signal exceeding the first vibration threshold.

2. The assembly of claim 1, wherein the instructions, when executed by the processor, further cause the processor to:

identify that the vibration measurement signal decreases below a second vibration threshold; and control the lubrication system to decrease the flow rate of the lubrication flow based on an identification of the vibration measurement signal decreasing below the second vibration threshold.

3. The assembly of claim 2, wherein the instructions, when executed by the processor, further cause the processor to:

identify that the vibration measurement signal decreases below the second vibration threshold after identification of the vibration measurement signal exceeding the first vibration threshold.

4. The assembly of claim 1, wherein the instructions, when executed by the processor, further cause the processor to:

filter the vibration measurement signal based on a crank angle of the first rotor.

5. The assembly of claim 4, wherein the instructions, when executed by the processor, further cause the processor to:

filter the vibration measurement signal for portions of the crank angle which are outside of one or more selected angle portions of a crank angle range.

6. The assembly of claim 5, wherein the one or more selected angle portions combined include less than 180 degrees of the crank angle range.

7. The assembly of claim 1, wherein the first vibration sensor is a single vibration sensor for the assembly.

8. The assembly of claim 7, wherein:

the plurality of rotors are axially distributed along a rotational axis of the assembly; and the first vibration sensor is mounted to the rotor housing at an axial center of the rotor housing.

9. The assembly of claim 1, further comprising a plurality of vibration sensors on the rotor housing, the plurality of vibration sensors including the first vibration sensor.

10. A method for controlling lubrication of a plurality of apex seals for a rotary engine, the method comprising:

generating a vibration measurement signal with a vibration sensor for a rotor including the plurality of apex seals;

monitoring the vibration measurement signal and identifying that the vibration measurement signal exceeds a first vibration threshold, monitoring the vibration measurement signal including filtering the vibration measurement signal based on a crank angle of the rotor; and controlling lubrication of the plurality of apex seals by increasing a flow rate of a lubrication flow for the plurality of apex seals based on an identification of the vibration measurement signal exceeding the first vibration threshold.

11. The method of claim 10, further comprising determining the first vibration threshold based on an engine power of the rotary engine.

12. The method of claim 10, wherein filtering the vibration measurement signal further includes filtering the vibration measurement signal for portions of the crank angle which are outside of one or more selected angle portions of a crank angle range.

13. The method of claim 12, wherein filtering the vibration measurement signal further includes determining the one or more selected angle portions based on an operational state of the rotory rotary engine.

14. An assembly for controlling lubrication of a plurality of apex seals for a rotary engine, the assembly comprising:

a rotor housing forming a first rotor cavity;

a first rotor disposed within the first rotor cavity, the first rotor configured for rotation within the first rotor cavity, the first rotor including the plurality of apex seals, each apex seal of the plurality of apex seals configured to form a seal between the first rotor and the rotor housing as the first rotor rotates within the first rotor cavity;

a first vibration sensor on the rotor housing, the first vibration sensor configured to generate a vibration measurement signal; and an engine control system in communication with the first vibration sensor, the engine control system including a processor in communication with a non-transitory memory storing instructions, which instructions when executed by the processor, cause the processor to:

filter the vibration measurement signal based on a crank angle of the first rotor; and compare that the filtered vibration measurement signal to a first vibration threshold to identify that a low lubricant flow condition is present or absent for at least one apex seal of the plurality of apex seals.

15. The assembly of claim 14, wherein the instructions, when executed by the processor, further cause the processor to:

filter the vibration measurement signal for portions of the crank angle which are outside of one or more selected angle portions of a crank angle range; or filter the vibration measurement signal for vibration frequencies which are outside of one or more selected vibration frequency ranges.

16. The assembly of claim 14, wherein the instructions, when executed by the processor, further cause the processor to:

generate a notification based on an identification of the filtered vibration measurement signal exceeding the first vibration threshold.

* * * * *